(12) United States Patent
Vallery (10) Patent No.: US 8,758,559 B2
(45) Date of Patent: *Jun. 24, 2014

(54) SYSTEMS AND METHODS FOR MAKING FIBER WEBS

(75) Inventor: David Vallery, Mason, NH (US)

(73) Assignee: Hollingsworth & Vose Company, East Walpole, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/559,189

(22) Filed: Jul. 26, 2012

(65) Prior Publication Data

US 2013/0025806 A1    Jan. 31, 2013

Related U.S. Application Data (60) Provisional application No. 61/512,028, filed on Jul. 27, 2011.

(51) Int. Cl.
*D21F 11/00* (2006.01)
(52) U.S. Cl.
USPC .................................................. 162/132
(58) Field of Classification Search
USPC ................................................. 162/132, 299
See application file for complete search history.

(56) References Cited

U.S. PATENT DOCUMENTS

| | | | | |
|---|---|---|---|---|
| 4,238,280 | A * | 12/1980 | Wallis et al. ............. | 162/157.5 |
| 4,888,094 | A | 12/1989 | Weisshuhn et al. | |
| 4,931,357 | A | 6/1990 | Marshall et al. | |
| 5,011,575 | A | 4/1991 | Keller | |
| 5,064,502 | A | 11/1991 | Turner | |
| 5,298,126 | A | 3/1994 | Dahl | |
| 5,645,689 | A | 7/1997 | Ruf et al. | |
| 5,674,364 | A | 10/1997 | Pitkajarvi | |
| 6,059,929 | A | 5/2000 | Dahl | |
| 6,099,692 | A | 8/2000 | Weisshuhn et al. | |
| 6,190,735 | B1 | 2/2001 | Radwanski et al. | |
| 6,251,225 | B1 | 6/2001 | Ruf et al. | |
| 6,410,465 | B1 * | 6/2002 | Lim et al. ............... | 442/389 |
| 6,764,566 | B1 | 7/2004 | Griesbach et al. | |
| 7,081,560 | B1 * | 7/2006 | Lim et al. ............... | 604/367 |
| 2002/0060040 | A1 | 5/2002 | Rulis et al. | |
| 2002/0153113 | A1 | 10/2002 | Ruf et al. | |
| 2003/0032350 | A1 | 2/2003 | Kajander et al. | |
| 2003/0056918 | A1 | 3/2003 | Hamalainen et al. | |
| 2003/0159790 | A1 | 8/2003 | Ruf et al. | |
| 2004/0170813 | A1 * | 9/2004 | Digiacomantonio et al. ................. | 428/195.1 |
| 2005/0034827 | A1 | 2/2005 | Soderberg | |
| 2005/0124250 | A1 | 6/2005 | Wilson et al. | |
| 2007/0012414 | A1 | 1/2007 | Kajander et al. | |
| 2008/0093042 | A1 | 4/2008 | Skoog et al. | |
| 2008/0110588 | A1 | 5/2008 | Lepomaki et al. | |
| 2009/0020251 | A1 | 1/2009 | Soderberg et al. | |
| 2010/0187712 | A1 | 7/2010 | Gupta et al. | |
| 2010/0319543 | A1 | 12/2010 | Witsch et al. | |
| 2012/0193056 | A1 | 8/2012 | Gupta et al. | |
| 2012/0312487 | A1 | 12/2012 | Guimond et al. | |
| 2013/0009335 | A1 | 1/2013 | Guimond et al. | |
| 2013/0025806 | A1 | 1/2013 | Vallery | |
| 2013/0025809 | A1 | 1/2013 | Godsay et al. | |

OTHER PUBLICATIONS

International Search Report and Written Opinion for PCT/US2012/037534 mailed on Jul. 27, 2012.
International Search Report and Written Opinion for PCT/US2012/48291 mailed on Sep. 20, 2012.
International Search Report and Written Opinion for PCT/US2012/48301 mailed on Sep. 20, 2012.

* cited by examiner

*Primary Examiner* — Mark Halpern
(74) *Attorney, Agent, or Firm* — Wolf, Greenfield & Sacks, P.C.

(57) ABSTRACT

Systems and methods for forming fiber webs, including those suitable for use as filter media and battery separators, are provided. In some embodiments, the systems and methods involve a first system for forming a fiber web (e.g., a wet laid system or non-wet laid system) and additionally one or more coating units. The first system for forming a fiber web may be used to form one or more fibrous layers of the fiber web, and the coating unit may be used to form an additional fibrous layer of the fiber web. In some embodiments, the systems and methods can be used to form fiber webs having a gradient in a property across a portion of, or the entire, thickness of the fiber web.

51 Claims, 4 Drawing Sheets

SYSTEMS AND METHODS FOR MAKING FIBER WEBS

RELATED APPLICATIONS

This application claims priority to U.S. Provisional Application No. 61/512,028, filed Jul. 27, 2011 which is incorporated herein by reference in its entirety.

FIELD OF INVENTION

The present invention relates generally to systems and methods for forming fiber webs, including fiber webs that are suitable for use as filter media and battery separators.

BACKGROUND

Fiber webs are used in a variety of applications, and in some embodiments can be used as filter media and battery separators. Generally, fiber webs can be formed of one or more fiber types including glass fibers, synthetic fibers, cellulose fibers, and binder fibers.

Fiber webs can be formed by a variety of processes. In some embodiments, fiber webs are formed by a wet laid process. A wet laid process may involve the use of similar equipment as a conventional papermaking process, which may include, for example, a hydropulper, a former or a headbox, a dryer, and an optional converter. Fibers may be collected on a screen or forming wire at an appropriate rate using any suitable machine such as a fourdrinier, a rotoformer, a cylinder, a pressure former, or an inclined wire fourdrinier. Although such processes may be used to form a variety of different fiber webs, improvements in the systems and methods for forming fiber webs would be beneficial and would find application in a number of different fields.

SUMMARY OF THE INVENTION

Systems and methods for forming fiber webs, including those suitable for use as filter media, are provided.

In one set of embodiments, a series of systems are provided. In one embodiment, a system comprises a fiber web-forming system for forming at least a first fibrous layer, and a coating unit positioned downstream of the fiber web-forming system for forming a second fibrous layer on the first fibrous layer. In certain embodiments, the system the fiber web-forming system comprises a flow distributor configured to dispense a fiber mixture, a flow zone positioned downstream of the flow distributor and configured to receive the fiber mixture from the flow distributor, and a fiber web forming zone, at least a part of which is positioned downstream of the flow zone, the fiber web forming zone configured to receive and collect fibers from the fiber mixture to form the first fibrous layer.

In another set of embodiments, a series of methods are provided. In one embodiment, a method of forming a fiber web comprises forming a first fibrous layer using a fiber web-forming system, forming a second fibrous layer on the first fibrous layer using a coating unit, and forming a fiber web comprising the first and second fibrous layers. In certain embodiments, the step of forming the first fibrous layer comprises dispensing a fiber mixture comprising a first fiber into a flow zone of the fiber web-forming system, and collecting a plurality of first fibers downstream of the flow zone in a fiber web forming zone to form the first fibrous layer.

Other aspects, embodiments, advantages and features of the invention will become apparent from the following detailed description.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Systems and methods for forming fiber webs, including those suitable for use as filter media and battery separators, are provided. In some embodiments, the systems and methods involve a first system for forming a fiber web (e.g., a wet laid system or a non-wet laid system) and additionally one or more coating units. The first system for forming a fiber web may be used to form one or more fibrous layers of the fiber web, and the coating unit may be used to form an additional fibrous layer of the fiber web. In some embodiments, the systems and methods described herein can be used to form fiber webs having a gradient in a property across a portion of, or the entire, thickness of the fiber web. Advantageously, in some embodiments, a system including a coating unit may allow the formation of a fiber web having certain desirable properties that may otherwise not be possible using conventional fiber web forming processes, as described in more detail below. Other features and advantages of the systems and methods described herein are provided below.

As described herein, a system for forming a fiber web may include a first fiber web-forming system and one or more coating units positioned downstream thereof. The first fiber web-forming system may include any suitable system such as a wet laid system (e.g., a pressure former, a rotoformer, a fourdrinier, a hybrid former, or a twin wire system), or a non-wet laid system (e.g., a dry laid system, an air laid system, a spunbond system, a meltblown system, an electrospinning system, or a carding system). The first fiber web-forming system may be used to form one or more fibrous layers, i.e., a preformed web, which may be, for example, non-woven or woven. The preformed web may be coated with one or more additional fibrous layers downstream using one or more coating units, as described in more detail below.

Figure 1:
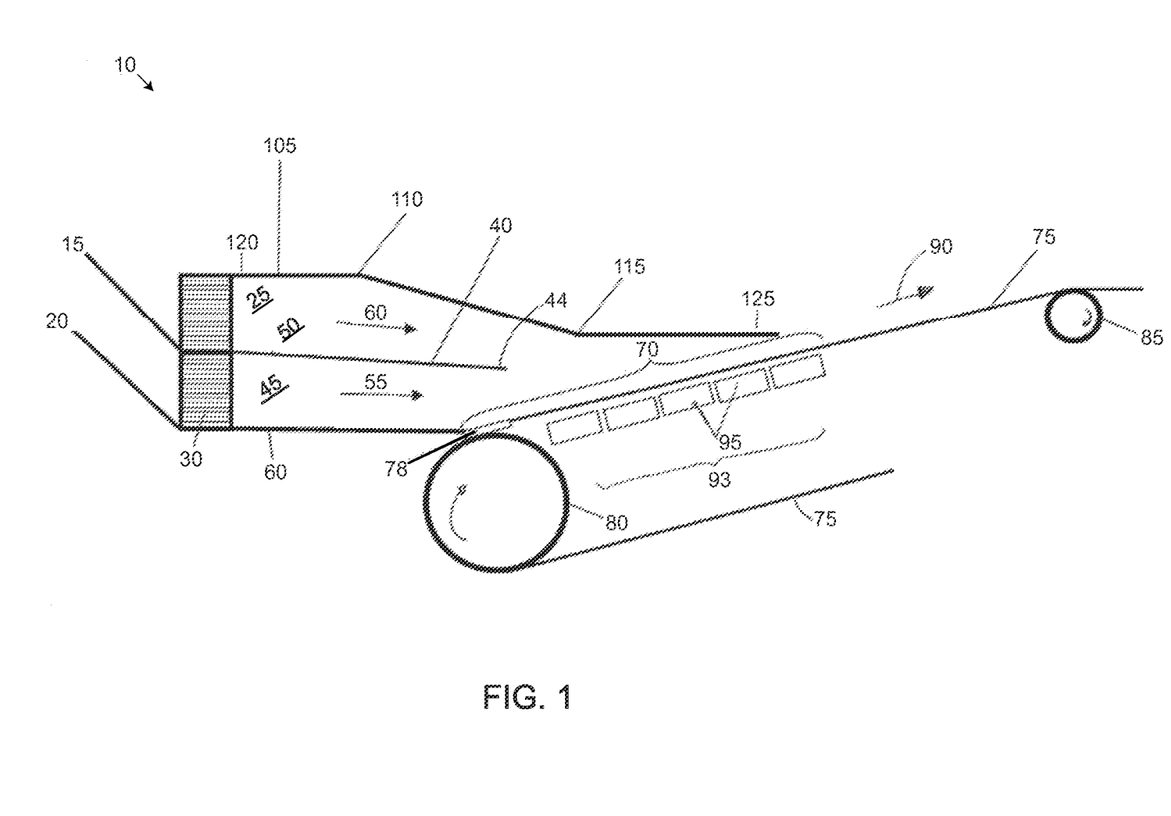
FIG. 1 is a schematic diagram showing a system for forming a fiber web according to one set of embodiments.

An example of a system for forming a fiber web using a wet laid process is shown in the embodiment illustrated in FIG. 1. As shown illustratively in FIG. 1, a system 10 may include flow distributors 15 and 20 (e.g., headboxes) configured to dispense one or more fiber mixtures into a flow zone 25 positioned downstream of the one or more flow distributors. Although two distributors are shown in FIG. 1, in some embodiments only a single flow distributor may be present; in other embodiments, three or more flow distributors may be present (e.g., for introducing three or more fiber mixtures into the system). In some embodiments, a distributor block 30 may be positioned between the one or more flow distributors and the flow zone. The distributor block may help to evenly distribute the one or more fiber mixtures across the width of the flow zone upon the mixture(s) entering the flow zone. Different types of distributor blocks are known in the art and can be used in the systems described herein. Alternatively, in some embodiments, the system need not include a distributor block.

As shown in the exemplary embodiment of FIG. 1, system 10 may include a lamella 40 positioned in the flow zone. The lamella may be used as a partition to divide the flow zone into a lower portion 45 and an upper portion 50 (or into additional portions when multiple lamellas are present, as described in more detail below). In certain embodiments, the lamella can be used to separate a first fiber mixture flowing in the lower portion of the flow zone from a second fiber mixture flowing in the upper portion of the flow zone. For example, a first fiber mixture dispensed from flow distributor 20 into the lower portion 45 of the flow zone may be separated from a second fiber mixture dispensed from flow distributor 15 into the upper portion 50 of the flow zone until the mixtures reach a downstream end 44 of the lamella, after which the first and second fiber mixtures are allowed to meet. The first and second fiber mixtures generally flow in the lower and upper portions of the flow zone in a downstream direction (e.g., in the direction of arrows 55 and 60, respectively). The flow profile of the fluids in the lower and upper portions of the flow zone can be altered, in part, by choosing a lamella with appropriate features, as described in more detail below.

A fiber web forming zone 70 may be configured to receive the first and second fiber mixtures. The fiber web forming zone is generally positioned downstream of the flow zone, although it may include portions of the flow zone. For example, in some embodiments, the fiber web forming zone may include a portion of the lower portion of the flow zone, as well as apron 78 which may be used to connect a bottom surface 100 of the flow zone to a forming wire 75. The forming wire may be a perforated support used to receive and collect the fibers as the forming wire rotates about a breast roll 80 and a couch roll 85. As such, the forming wire may be used to transport the fibers collected from the fiber mixtures in the general direction of arrow 90 for further downstream processing, while allowing liquid from the fiber mixtures to be removed by gravity and/or by a dewatering system 93. Any suitable dewatering system can be used, including a series of vacuum boxes 95. The forming wire may be positioned at an incline with respect to the horizontal as shown in FIG. 1, although other positions are also possible, including having the forming wire at a horizontal position itself. In some embodiments, the fiber web forming zone is entirely downstream of the flow zone.

As shown illustratively in FIG. 1, in some embodiments system 10 may be a substantially closed system in which the flow zone is substantially enclosed by bottom surface 100 and a top surface 105. The top surface may include one or more joints 110 and 115, which may be used to shape the top surface and affect the flow profile of one or more fiber mixtures flowing in the system. It should be appreciated that configurations other than the ones shown in FIG. 1 are possible. For example, in some embodiments the top surface does not include any joints 110 or 115. In other embodiments, bottom surface 100 may include one or more joints. Additionally, although surfaces 100 and 105 are shown as flat portions of material, in other embodiments these surfaces may be curved or have any other suitable shape. Furthermore, one or more portions of the bottom and/or top surface may be horizontal, positioned at an incline with respect to the horizontal, or positioned at a decline with respect to the horizontal.

In certain embodiments, system 10 may be a pressure former. System 10 may be a closed system and the pressure of the one or more fiber mixtures in the flow zone may be maintained and/or controlled by, for example, controlling the pressure or volume of the one or more fiber mixtures introduced into the flow zone and controlling the distance between the top surface and the bottom surface or forming wire (e.g., the void volume in the forming zone).

In some cases, system 10 is an open system and does not include a top surface 110. In other cases, system 10 does not include a bottom surface 100 but instead, a fiber mixture flows directly onto a forming wire. Other configurations are also possible.

The size of system 10, which may be controlled in part by choosing appropriate dimensions for the top and/or bottom surfaces of the system, may vary as desired. For example, in some embodiments, the length of the top surface may range from about 300 mm to about 2,000 mm (e.g., between about 300 mm to about 1,000 mm, between about 600 mm to about 1,700 mm, or between about 1,000 mm to about 2,000 mm). In some embodiments, the length of the top surface may be, for example, greater than about 300 mm, greater than about 600 mm, greater than about 1,000 mm, greater than about 1,400 mm, or greater than about 1,700 mm. In other embodiments, the length of the top surface may be, for example, less than about 2,000 mm, less than about 1,700 mm, less than about 1,400 mm, less than about 1,000 mm, or less than about 600 mm. Other lengths are also possible. In some embodiments, the length of the top surface is determined by measuring the absolute distance between the two ends of the top surface. In other embodiments, the length of the top surface is determined by measuring the sum of the lengths of the surface portions of the top surface (including the lengths of each portion of the top surface between any joints).

The length of the bottom surface may range from, for example, about 100 mm to about 2,000 mm (e.g., between about 100 mm to about 700 mm, between about 300 mm to about 1,000 mm, between about 300 mm to about 800 mm, or between about 1,000 mm and about 2,000 mm). In some embodiments, the length of the bottom surface may be, for example, greater than about 100 mm, greater than about 300 mm, greater than about 500 mm, greater than about 700 mm, or greater than about 1,200 mm. In other embodiments, the length of the bottom surface may be, for example, less than about 1,700, less than about 1,300, less than about 1,000 mm, less than about 700 mm, less than about 500 mm, or less than about 300 mm. Other lengths are also possible. In some embodiments, the length of the bottom surface is determined by measuring the absolute distance between the two ends of the bottom surface. In other embodiments, the length of the bottom surface is determined by measuring the sum of the lengths of the surface portions of the bottom surface (including the lengths of the bottom surface between any joints).

The width of the top and bottom surfaces may also vary. In some cases, the average width of the top or bottom surface is between about 500 mm and about 12,500 mm (e.g., between about 6,000 mm and about 12,500 mm, between about 500 mm and about 6,000 mm, or between about 3,000 and about 9,000 mm). In some embodiments, the average width of the top or bottom surface may be, for example, greater than about 500 mm, greater than about 1,000 mm, greater than about 3,000 mm, greater than about 6,000 mm, or greater than about 9,000 mm. In other embodiments, the width of the top or bottom surface may be, for example, less than about 12,500 mm, less than about 9,000 mm, less than about 6,000 mm, less than about 3,000 mm, or less than about 1,000 mm. Other average widths of the top or bottom surfaces are also possible.

The width of the top and bottom surfaces may be substantially uniform across the length of the surface, or in other embodiments, may vary along the length of the surface. For example, in some cases, an upstream portion 120 of the top surface may be wider than a downstream portion 125 of the top surface, and may optionally taper from the upstream to the downstream portions. The bottom surface may have a configuration similar to that the top surface, or may different from that other top surface. Other configurations are also possible.

The size of system 10 may also be controlled in part by choosing appropriate distances between the top and bottom surfaces of the system and/or an appropriate height of the distributor block. Generally, a distance between the top and bottom surfaces at the upstream end of flow zone, and/or a height of a distributor block, may be between about 10 mm and about 2,000 mm (e.g., between about 10 mm and about 500 mm, between about 500 mm and about 1,000 mm, or between about 1,000 mm and about 2,000 mm). In some cases, the distance between the top and bottom surfaces at the upstream end of flow zone, and/or a height of a distributor block, may be greater than about 10 mm, greater than about 200 mm, greater than about 500 mm, greater than about 1,000 mm, greater than about 1,500 mm. In other cases, the distance between the top and bottom surfaces at the upstream end of flow zone, and/or a height of a distributor block, may be less than about 2,000 mm, less than about 1,500 mm, less than about 1,000 mm, less than about 500 mm, or less than about 200 mm. Other values are also possible.

The top and bottom surfaces can be made of any suitable material. Generally, the materials for top and bottom surfaces are chosen for their strength and anti-corrosion properties. Examples of suitable materials may include metals (e.g., stainless steel, composite steels), polymers (e.g., soft latex, rubbers, high density polyethylene, epoxy, vinylester, polyester), fiber-reinforced polymers (e.g., using fiberglass, carbon, or aramid fibers), ceramics, and combinations thereof. The top and bottom surfaces may be formed of a single piece of material, or may be formed by combining two or more pieces of materials.

It should be appreciated that the components in system 10 are not limiting and that in some embodiments, certain components shown in FIG. 1 need not be present in a system, and in other embodiments, other components may optionally be present. For example, in some embodiments, system 10 further includes a secondary flow distributor (not shown) positioned downstream of fiber web forming zone 70. The secondary flow distributor may be used to position one or more additional layers on top of the fiber web formed using the system shown in FIG. 1. The secondary flow distributor may be positioned so that forming wire 75 carrying the drained fibers from fiber web forming zone 70 passes underneath the secondary flow distributor. One or more secondary fiber mixtures can then be laid on top of, and then drained through, the already formed fiber web. The water can then be removed by a secondary dewatering system resulting in a combined web including fibers from the system shown in FIG. 1 as one or more bottom layers, and fibers from the secondary flow distributor as a top layer. The resulting fiber web can be dried by various methods such as by passing over a series of dryer cans. The dried web can then be optionally wound into rolls at a reel.

Optionally, one or more secondary flow distributors and/or other components can be used to add one or more additives to a fiber web. A secondary flow distributor may be used to introduce, for example, a binder and/or other additives to a pre-formed fiber web. In one such embodiment, as a pre-formed fiber web is passed along the forming wire, a binder resin (which may be in the form of one or more emulsions) may be added to the fiber web. The binder resin may be pulled through the fiber web using dewatering system 93, or a separate dewatering system further downstream. In certain embodiments, one or more of the components included in the binder resin may be diluted with softened water and pumped into the fiber web. Other systems and methods for introducing additives to a fiber web are also possible.

As described above, a lamella may be positioned in the flow zone to partition the flow zone into at least an upper portion and a bottom portion. Although a single lamella is shown in the system illustrated in FIG. 1, in other embodiments the flow zone may not include a lamella positioned therein, or the flow zone may include more than one lamella for separating three or more fiber mixtures. In some such embodiments, the flow zone may be separated into three, four, or more distinct portions, each of which may contain a different fiber mixture or the same fiber mixture. The lamella may be positioned in any suitable position within the flow zone, and may vary depending on relative volumes of the fiber mixtures in the upper and lower portions of the flow zone. For example, although FIG. 1 shows the lamella being positioned at the center of the distributor block to allow substantially equal volumes and/or flow velocities of the fiber mixtures in each of the upper and lower portions of the flow zone, in other embodiments the lamella may be positioned higher or lower with respect to the distributor block to allow a larger or smaller portion of one fiber mixture in the flow zone relative to the other. Furthermore, although FIG. 1 shows that the lamella is positioned at a slight decline with respect to the horizontal, in other embodiments the lamella may be substantially horizontal, or positioned at an incline with respect to the horizontal. Other positions of the lamella in the flow zone are also possible.

A lamella may be attached to a portion of a system for forming a fiber web using any suitable attachment technique. In some embodiments, a lamella is attached directly to a distributor block. In other embodiments, a lamella is attached to a threaded rod positioned vertically within a portion of the flow zone. In certain embodiments, attachment involves the use of adhesives, fasteners, metallic banding systems, railing mechanisms, or other support mechanisms. Other attachment mechanisms are also possible.

The lamella may have any suitable dimensions. In some embodiments, the lamella has a length of, for example, between about 1 mm and about 2,000 mm (e.g., between about 100 mm and about 500 mm, between about 100 mm and about 1,000 mm, or between about 1,000 mm and about 2,000 mm). The length of the lamella may be, for example, greater than about 1 mm, greater than about 100 mm, greater than about 300 mm, greater than about 500 mm, or greater than about 1,000 mm. In other cases, the length of the lamella is less than about 2,000 mm, less than about 1,000 mm, less than about 500 mm, less than about 300 mm, or less than about 100 mm. The length of the lamella is determined by measuring the absolute length of the lamella. In some instances, the lamella extends from the distributor block to the dewatering system (e.g., an upstream-most vacuum box). In other instances, the lamella extends from the distributor block until the downstream end of the top surface. Other configurations are also possible.

The width of the lamella typically extends the width of the flow zone, although other configurations are also possible.

The thickness of the lamella can also vary. For example, the average thickness of the lamella may be between about 1/16" to about 4" (e.g., between about 1/16" to about 1", between about 1" to about 4", between about 1/8" to about 1/4", or between about 1/8" to about 1/6"). In some cases, the average thickness of the lamella is greater than about 1/8", greater than about 1/6", greater than about 1/4", greater than about 1/2", greater than about 1", or greater than about 2". In other cases, the average thickness of the lamella is less than about 2", less than about 1", less than about 1/2", less than about 1/4", less than about 1/6", or less than about 1/8". In yet other embodiments, the thickness of the lamella can vary along the length of the lamella. For example, the thickness of the lamella may taper along its length (e.g., from about 1/4" to about 1/8"). Other thicknesses are also possible.

The lamella can be made of any suitable material. Generally, the materials for the lamella are chosen for their strength and anti-corrosion properties. Examples of suitable materials may include metals (e.g., stainless steel, composite steels), polymers (e.g., soft latex, rubbers, high density polyethylene, epoxy, vinylester, polyester), fiber-reinforced polymers (e.g., using fiberglass, carbon, or aramid fibers), ceramics, and combinations thereof. The lamella may be formed of a single piece of material, or may be formed by combining two or more pieces of materials.

As described herein, in some embodiments, system 10 of FIG. 1 can be used to form a fiber web including two or more layers, e.g., using first and second fiber mixtures. In some embodiments, it is desirable to reduce or limit the amount of mixing between the first and second fiber mixtures at or near the fiber web forming zone. Typically, the fiber mixtures are flowed laminarly in the flow zone to achieve limited amounts of mixing. In other embodiments, it is desirable to promote larger amounts of mixing between the first and second fiber mixtures at or near the fiber web forming zone. In such embodiments, the flow of a fiber mixture in at least a portion of the flow zone may be non-laminar (e.g., turbulent). The degree of mixing of the first and second fiber mixtures may control the presence, absence, and/or type of gradient in the resulting fiber web, as described in more detail herein.

Laminar flow is generally characterized by the flow of a fluid having a relatively low Reynolds number. In some embodiments, flow of a fiber mixture in at least a portion of a flow zone is laminar and may have a Reynolds number of, for example, less than about 2,300, less than about 2,100, less than about 1,800, less than about 1,500, less than about 1,200, less than about 900, less than about 700, or less than about 400. The Reynolds number may have a range from, for example, between about 2,300 and about 100. Other values and ranges of Reynolds numbers are also possible.

In some embodiments, the flow of a fiber mixture in at least a portion of a flow zone is non-laminar (e.g., turbulent), and may have a Reynolds number that is greater than about 2,100, greater than about 2,300, greater than about 3,000, greater than about 5,000, greater than about 10,000, greater than about 13,000, or greater than about 17,000. The Reynolds number may have a range from, for example, between about 2,100 and about 20,000. Other values and ranges of Reynolds numbers are also possible.

The flow of a fiber mixture may also have a Reynolds number at the transition between laminar and turbulent flow (e.g., between about 2,100 and about 4,000). Other values and ranges of Reynolds numbers are also possible. Those of ordinary skill in the art can vary the Reynolds number of a flow by, for example, altering the flow velocity of the fiber mixture, viscosity of the fiber mixture, density of the fiber mixture, and/or the dimensions of the flow zone using known methods in combination with the description provided herein.

The degree of mixing of the first and second fiber mixtures can be controlled by varying different parameters. Examples of parameters that can be varied to control the level of mixing between fiber mixtures include, but are not limited to, the magnitude of the flow velocities of the fiber mixtures flowing in the flow zone, the relative difference in flow velocities between fiber mixtures flowing in the lower and upper portions of the flow zone, the flow profile of the fiber mixtures flowing in the lower and upper portions of the flow zone (e.g., laminar flow or turbulent flow), the volume of the flow zone (including the relative volumes of the lower and upper portions of the flow zone), the length of the lamella, the size and length of the forming zone, the level of vacuum used (if any) in the dewatering system, the density of the fiber mixtures (including the difference in densities of the fiber mixtures in the lower and upper portions of the flow zone), the particular chemistry of the fiber mixtures (e.g., pH, presence/absence of particular viscosity modifiers) including the difference in chemistry of the fiber mixtures in the lower and upper portions of the flow zone, and the sizes (e.g., lengths, diameters) of the fibers in the fiber mixtures. In certain embodiments described herein, one or more of such parameters are varied to control the degree of mixing between fiber mixtures.

In some embodiments, the flow velocity of a fiber mixture and/or the degree of mixing between fiber mixtures in a flow zone may be varied using a system or method described in U.S. application Ser. No. 13/469,352, filed May 11, 2012 and entitled "Systems and Methods for Making Fiber Webs" and/or U.S. application Ser. No. 13/469,373, filed May 11, 2012 and entitled "Systems and Methods for Making Fiber Webs", each of which is incorporated herein by reference in its entirety for all purposes.

As described herein, in some embodiments, at least some mixing between fiber mixtures is desired at or near the fiber web forming zone to create a gradient in one or more properties in a fiber web. Intermixing between fiber mixtures may be produced, in some embodiments, by creating turbulent flow at or near the downstream end of the lamella where two fiber mixtures meet (e.g., at or near the fiber web forming zone). Turbulent flow at or near the downstream end of the lamella may be promoted by, for example, disrupting laminar flow in one or more regions of the flow zone. For example, in some cases laminar flow is disrupted in the lower portion of the flow zone such that the fiber mixture in that portion, upon reaching the downstream end of the lamella, interjects into at least a part of the fiber mixture above it. Eddies may be formed that cause mixing of the fiber mixtures at the fluid interface between the mixtures Likewise, intermixing can be produced by disrupting laminar flow in an upper portion of the flow zone such that, upon the fiber mixture in the upper portion reaching the downstream end of the lamella, at least a part of the fiber mixture interjects into the fiber mixture below it. In other embodiments, laminar flow in both the upper and lower portions of the flow zone can promote intermixing of the fiber mixtures at or near the fiber web forming zone.

It should be appreciated that while disruption of laminar flow is desired in some embodiments, in other embodiments, it is not desirable to disrupt laminar flow.

In general, a fiber mixture may have any suitable flow velocity. As described herein, the flow velocity of a fiber mixture may vary in a portion of flow zone (e.g., in a lower or upper portion of the flow zone) and/or a fiber web forming zone, e.g., as shown in any of the figures. In some embodiments, the flow velocity of a fiber mixture varies between about 1 m/min to about 1,000 m/min (e.g., between about 1 m/min to about 100 m/min, between about 10 m/min to about 50 m/min, between about 100 m/min to about 500 m/min, or between about 500 m/min to about 1,000 m/min), although other ranges are also possible. In some embodiments, the flow velocity of a fiber mixture may be greater than about 1 m/min, greater than about 10 m/min, greater than about 20 m/min, greater than about 30 m/min, greater than about 40 m/min, greater than about 50 m/min, greater than about 70 m/min, greater than about 100 m/min, greater than about 200 m/min, greater than about 300 m/min, greater than about 400 m/min, greater than about 600 m/min, greater than about 800 m/min, or greater than about 1,000 m/min. In other embodiments, the flow velocity of a fiber mixture may be less than about 1,800 m/min, less than about 1,500 m/min, less than about 1,000 m/min, less than about 800 m/min, less than about 600 m/min, less than about 500 m/min, less than about 400 m/min, less than about 300 m/min, less than about 200 m/min, less than about 150 m/min, less than about 100 m/min, less than about 80 m/min, less than about 70 m/min, less than about 50 m/min, less than about 40 m/min, less than about 30 m/min, less than about 20 m/min, or less than about 10 min/min. Combinations of the above-noted ranges are also possible (e.g., a flow velocity of greater than about 10 m/min and less than about 1,000 m/min). Other values of flow velocity are also possible.

In some embodiments, a system for forming a fiber web includes one or more coating units positioned downstream of a first fiber web-forming system for forming a fibrous layer onto one or more layers of a preformed fiber web or onto fibers of a fiber mixture from the first fiber web-forming system. Advantageously, in some embodiments, a system including a coating unit may allow the formation of a fiber web having certain desirable properties that may otherwise not be possible using conventional fiber web forming processes. In some instances, the resulting fiber web may include one or more gradients across all or portions of the thickness of the web as described herein.

Figure 2:
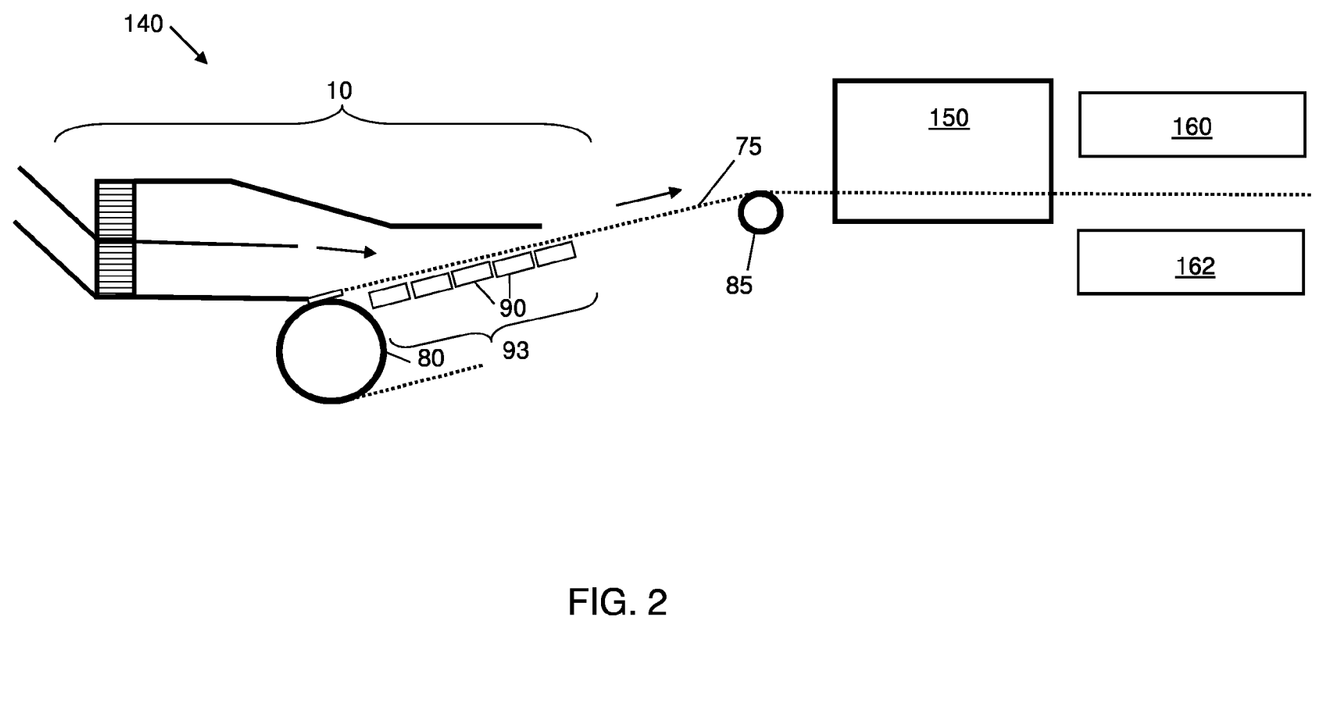
FIG. 2 is a schematic diagram showing a system for forming a fiber web including a coating unit according to one set of embodiments.

An example of a system that includes a coating unit is shown in the embodiment illustrated in FIG. 2. As shown illustratively in FIG. 2, a system 140 may include system 10 of FIG. 1 and a coating unit 150 positioned downstream of system 10. It should be appreciated, however, that in other embodiments, other web-forming systems can be used in place of system 10, such as a different wet laid system (e.g., a pressure former, a rotoformer, a fourdrinier, a hybrid former, or a twin wire system), or a non-wet laid system (e.g., a dry laid system, an air laid system, a spunbond system, a meltblown system, an electrospinning system, or a carding system), or combinations thereof.

As a fiber web is formed from system 10 and is transported along forming wire 75 in the downstream direction, the coating unit may form a coating layer onto one or more surfaces of the preformed fiber web or fibers of the fiber mixture from an upstream system. The coating layer typically includes a fiber mixture containing one or more fibers, a solvent, and optionally other additives, as described in more detail below. For instance, in certain embodiments involving the use of a wet laid system for forming a preformed fiber web or fiber mixture, the preformed fiber web or fiber mixture may contain a combination of solids (e.g., fibers) and solvent at the time a coating layer is positioned on the web. In some embodiments, the preformed web or fiber mixture from the upstream system may contain solvent in an amount of, for example, at least about 5 wt %, at least about 10 wt %, at least about 20 wt %, at least about 30 wt %, at least about 40 wt %, at least about 50 wt %, at least about 60 wt %, at least about 70 wt %, or at least about 80 wt % at the time a coating layer is positioned on the web. In other embodiments, the preformed web or fiber mixture from the upstream system contains relatively low amounts of solvent or moisture (e.g., less than about 30 wt %, less than about 20 wt %, less than about 10 wt %, less than about 5 wt %, or less than about 1 wt % solvent or moisture) at the time a coating layer is positioned on the web. For example, webs formed by non-wet laid systems may contain little or no moisture during the coating step. After the coating layer is positioned onto one or more surfaces of the preformed fiber web or fiber mixture from the upstream system, all or portions of a solvent may be removed from the coating layer to form a fibrous layer.

Coating unit 150 may be used to form a coating layer on one side (e.g., a top side) of a preformed fiber web or fiber mixture from the upstream system, which may include one or more layers as described herein. In some embodiments, the same coating unit may be used to form a second coating layer on the other side (e.g., a bottom side) of the preformed fiber web or fiber mixture from the upstream system. In other embodiments, a second coating unit (e.g., positioned adjacent coating unit 150) may be used to form a second coating layer on the other side (e.g., a bottom side) of the preformed fiber web or fiber mixture from the upstream system. In yet other embodiments, a second coating unit may be used to form a second coating layer on top of the first coating layer formed by coating unit 150. Other configurations of coating units are also possible.

In some embodiments, additional coating units (e.g., 2, 3, 4, 5, etc. coating units) can be used to form multiple coating layers or fibrous layers onto a preformed fiber web or fiber mixture from the upstream system (e.g., 2, 3, 4, 5, etc. coating layers or fibrous layers). Where multiple coating units are included in a system, the coating units may be used to coat the same fiber mixture, or a different fiber mixture, onto a preformed fiber web or fiber mixture from the upstream system. For example, in some embodiments, a first coating unit may be used to form a first coating or fibrous layer onto a preformed fiber web or fiber mixture from the upstream system. In certain embodiments in which the thickness of the first coating or fibrous layer may, for example, be limited by the first coating unit, a second coating unit may be used to add the same fiber mixture on top of the first coating or fibrous layer to form a thicker layer. In other embodiments, a second coating or fibrous layer of different composition can be added on top of the first coating or fibrous layer.

Any suitable coating unit may be used to form a coating layer or fibrous layer, or to otherwise position fibers onto a preformed fiber web or fiber mixture from the upstream system. Non-limiting examples of coating units include a slot die coater, a gravure coater, a sizepress coater (e.g., a two roll-type or a metering blade type sizepress coater), a filmpress, a blade coater, a roll-blade coater, an air knife coater, a roll coater, a reverse roll coater, a bar coater, a curtain coater, a champlex coater, a brush coater, a Bill-blade coater, a short dwell-blade coater, a lip coater, a gate roll coater, a gate roll sizepress coater, and a spray coater. Other coating units are also possible. In some embodiments, combinations of coating units can be used in a system.

In a slot die coating unit, a coating mixture is forced out from a reservoir through a slot by pressure and transferred to a moving web. In practice, the slot is generally much smaller in cross-section than the reservoir, and is oriented perpendicular to the direction of web movement.

A gravure coater is used in a printing or saturating process that uses intaglio, or recessed carriers. The carrier, which is flat or cylindrical, moves through a pool of coating mixture. A blade scrapes excess mixture off the plane of the plate, leaving mixture in the recessed wells. A second cylinder can be used to press the web onto the plates, where the web picks up mixture from the wells.

A sizepress coater is a machine used to apply treatments to a web to give it special qualities. A sizepress coater normally comprises a pair of rolls towards the end of a dryer train between which a dried or partially dried web is passed. The web then passes into a nip where a coating mixture is applied to impart properties to the web.

A filmpress coater is a type of sizepress coater. The filmpress may be operated to achieve a metered amount of mixture add on. The press typically comprises two (sometimes three) small diameter rolls on each side of the sizepress cylinders that are called gate rolls. The gate rolls control the mixture film thickness on the transfer cylinder. The transfer cylinder applies the film to a desired surface (e.g., a web). A second cylinder can be used to press the web onto the transfer cylinder, but it is not required. Web tension may be used to maintain intimate contact between the transfer roll and the web.

In some embodiments, a coating unit can be modified to accommodate the fibrous mixture that is introduced into the coating unit. For example, in one set of embodiments, the coating unit may include a mixer or an agitator in certain areas of the coating unit, or associated with the coating unit, to prevent or reduce the likelihood of the fibrous mixture settling or separating into different parts. Different types of mixers and agitators can be used, including but not-limited to blade type mixers and agitators and air bubblers. In some embodiments, the mixer or agitator may be added to low velocity areas of the coating unit, such as a traditional gravure pan or a sizepress pan. In some cases, the mixer or agitator may be added to a supply tank associated with a coating unit. In an area of the coating unit where the fibrous mixture cannot be mixed or agitated, a forward velocity of the fiber mixture may be kept above a certain velocity to prevent or reduce the likelihood of the fibrous mixture settling or separating into different parts. For example, the forward velocity of the fiber mixture may be kept above 0.1 m/s, above 0.5 m/s, above 1 m/s, above 2 m/s or above 5 m/s while the fiber mixture is in a portion of the coating unit. Other velocities are also possible. The forward velocity may be maintained using a pump or other suitable component.

In some embodiments, and as shown illustratively in FIG. 2, forming wire 75 leads directly into a portion of the coating unit. In other embodiments, the forming wire may end upstream of the coating unit, and the preformed web or fiber mixture from the upstream system may be transported onto a secondary surface that is compatible with the coating unit. The secondary surface may be, for example, a separate forming wire, a felt carrier, conveyor, or other suitable surface. The secondary surface may be used, in some embodiments, to minimize cross contamination between the coating process and the previous process used to form the preformed fiber web or any subsequent processes. In other embodiments, the secondary surface may be used to impart a surface quality to the fiber web, such as by smoothing or roughing a surface of the fiber web. In certain embodiments, transport of the fiber web onto a secondary surface may facilitate cleaning of the forming wire.

After the coating layer is positioned onto a surface of the preformed fiber web or onto fibers of the fiber mixture from the upstream system, the resulting web may be transported to one or more optional dewatering systems 160 and/or 162 positioned downstream of the coating unit. The dewatering system may be used to remove solvent from the coating layer and/or any remaining solvent present in the preformed fiber web or fiber mixture from the upstream system. Any suitable dewatering system can be used, such as vacuum boxes, driers, heaters, foils, and combinations thereof. It should be appreciated that other configurations are possible, and that in some embodiments, optional dewatering systems 160 and/or 162 may be positioned upstream of the coating unit. In certain embodiments, a combination of dewatering systems 160 and/or 162 may be positioned both upstream and downstream of the coating unit. In yet other embodiments, removal of all or portions of a solvent from the coating layer can take place by absorption of the solvent by the preformed layer (which may be previously dried or partially dried). In some such embodiments, a dewatering system may not be needed.

By decoupling dewatering systems 160 and/or 162 from that of dewatering system 93, certain materials that may not be compatible with dewatering system 93 may be used in the coating layer. For example, in some embodiments, a coating layer including very fine fibers can be formed on a preformed fiber web or on fibers of a fiber mixture from an upstream system, where the fine fibers would have otherwise be pulled through the entire web (and removed from the web) if the web was dried using strong vacuum boxes as part of dewatering system 93. In some cases, materials that are not compatible with a wet laid process can be used in a coating layer. For example, in some embodiments, materials that are hazardous in waste water systems and require special handling may be used in a coating layer and separated from a wet laid process. In other embodiments, a material that may react with or negatively affect one or more components of the fiber mixture used to form the preformed web may be used in a coating layer. For example, certain materials used in a coating layer may cause flocculation of the fibers in a fiber mixture for a wet laid process. In another example, certain coating materials may cause discoloration of the fiber mixture used in a wet laid process.

It should be appreciated that in other embodiments, dewatering systems 160 and 162 need not be present.

Where dewatering systems 160 and/or 162 are present, one or both may be different from dewatering system 93. For example, while dewatering system 93 may include a series of vacuum boxes, dewatering system 160 and/or 162 may include a drier or a heater. In other embodiments, however, dewatering systems 160 and/or 162 may be the same as that of dewatering system 93.

In some embodiments, dewatering system 160, which is positioned facing a top side of a fiber web formed by system 10, may be used to remove a solvent from the coated fiber web. In embodiments in which a coating layer is positioned on the top side of a preformed fiber web (or on fibers of a fiber mixture from an upstream system), dewatering system 160 may be used to limit the amount of intermixing between fibers of the coating layer and those of the preformed fiber web (or fiber mixture). For example, in one embodiment, a coating layer may include fibers having smaller diameters than those of the top surface of the preformed fiber web, and the use of dewatering system 160 can be used to pull the solvent from the coating layer upwards to reduce the amount of fibers from the coating layer falling into the inner portions of the preformed fiber web. In embodiments in which intermixing between fibers of the coating layer and those of the preformed fiber web is desired, however, dewatering system 162 may be used to pull fibers from the coating layer into the inner portions of the preformed fiber web.

Similarly, if a coating layer is positioned on the bottom side of a preformed fiber web, dewatering system 162 may be used to limit the amount of intermixing between fibers of the coating layer and those of the preformed fiber web. If intermixing between fibers of the coating layer and those of the preformed fiber web is desired, dewatering system 160 may be used to pull fibers from the coating layer into the inner portions of the preformed fiber web.

In some embodiments, both dewatering systems 160 and 162 may be used simultaneously to remove one or more solvents from a coated web. The dewatering systems may be operated at the same level, or one may be operated to have a greater water removing ability than the other. For example, dewatering system 160 may be used to remove a majority of the solvent from a coating layer positioned on top of a preformed fiber web, and dewatering system 162 may be used to pull some fibers from the coating layer down into the inner portions of the preformed fiber web. The strength of dewatering system 162 may be controlled to vary the amount of fiber intermixing.

In other embodiments, dewatering systems 160 and 162 may be positioned in series. For example, a first dewatering system may be used to remove solvent from a top side of a coated fiber web, and a second dewatering system downstream of the first dewatering system may be used to remove solvent from a bottom side (or top side) of the coated fiber web. Other configurations of dewatering systems are also possible.

In certain embodiments in which all or portions of a solvent is removed from a coating layer, the fibers may remain on a side (e.g., top side or bottom side) of a preformed fiber web to form a fibrous layer (although a fibrous layer may also be formed without removing a solvent from the coating layer, as described herein). In some embodiments, system 140 may be used to form a fibrous layer on a single side (e.g., a top side or a bottom side) of a preformed fiber web. In other embodiments, fibrous layers can be formed on both sides of the preformed fiber web. In yet other embodiments, system 140 can be used to form a second fibrous layer on top of a first fibrous layer. Third, fourth, fifth, etc. fibrous layers are also possible. As described herein, all or portions of the fibers from a fibrous layer may be intermixed with fibers from another fibrous layer formed by a coating unit, or with fibers from the preformed fiber web. In some embodiments, intermixing results in layers that are indistinguishable from one another across the thickness of the resulting fiber web. Other configurations are also possible.

It should be appreciated that the components in system 140 of FIG. 2 are not limiting and that in some embodiments, certain components shown in FIG. 2 need not be present in a system, and in other embodiments, other components may optionally be present. For example, in certain embodiments, other types of web production apparatuses can be used in place of system 10 of FIG. 2. For example, in some embodiments, any suitable system for a wet laid or non-wet laid forming process may be used, such as those described herein. Other systems and apparatuses are also possible.

Any suitable fiber mixture may be introduced into a system for forming a fiber web. As described herein, a fiber mixture may be introduced into a first fiber web-forming system such as those described herein and/or a coating unit of a system. A fiber mixture may contain a mixture of at least one or more fibers and a solvent such as water. In some embodiments, non-aqueous solvents such as alcohols and hydrocarbons (e.g., petroleum distillates) can be used. In certain embodiments, a combination of aqueous and non-aqueous solvents, can be used. Examples of fibers include glass fibers, synthetic fibers, cellulose fibers, and binder fibers. The fibers may have various dimensions such as fiber diameters between about 0.1 microns and about 50 microns (e.g., between about 0.1 microns and about 1 micron, between about 0.1 microns and about 2 microns, between about 0.1 microns and about 5 microns, between about 1 micron and about 5 microns, between about 0.1 microns and about 10 microns, between about 5 microns and about 10 microns, between about 1 micron and about 20 microns, or between about 10 microns and about 50 microns). The mixture may optionally contain one or more additives such as pH adjusting materials, viscosity modifiers (e.g., thickeners), binders, fillers, resins, crosslinkers, suspension aids, colors, repellents, latexes, processing aids, flocculants, retention aids, and surfactants.

In some embodiments, the fibers of a fiber mixture used in a coating system have diameters that are less than about 10 microns, less than about 5 microns, less than about 3 microns, less than about 2 microns, less than about 1 micron, or less than about 0.5 microns. The average fiber diameter of the fibers in a fibrous layer formed by a coating system may, in some embodiments, be smaller than the average fiber diameter of a fibrous layer formed by an upstream web-forming system (e.g., a wet laid or non-wet laid system). It should be appreciated, however, that this not need be the case in all embodiments.

The terms "first fiber mixture" and "second fiber mixture" as used herein generally refer to fiber mixtures used or flowing in different portions of a system for forming a fiber web. For example, a first fiber mixture may flow in a lower portion of a flow zone of a wet laid system, and a second fiber mixture may flow in an upper portion of the flow zone. In some embodiments, a third fiber mixture may be introduced into a coating unit for forming a coating layer. In other embodiments, a first fiber mixture may be introduced into a first fiber-web forming system, and a second fiber mixture may be introduced into a coating unit. It should be appreciated that while a first fiber mixture and a second fiber mixture (and/or third fiber mixture) may be different, in other embodiments the fiber mixtures may be the same. For example, in one set of embodiments, a first fiber mixture has the same composition as a second fiber mixture (e.g., a first fiber mixture may have the same types of components and the same concentration of components as those of a second fiber mixture). In other embodiments, a first fiber mixture has a different composition from that of a second fiber mixture (e.g., a first fiber mixture may have at least one different type of component and/or a different concentration of at least one component from that of a second fiber mixture). Types of components that may differ between fiber mixtures may include, for example, fiber type, fiber diameter, and additive type.

In one particular set of embodiments, a "first fiber" contained in the first fiber mixture may be the same as a "second fiber" contained in the second fiber mixture. In other embodiments, a "first fiber" contained in the first fiber mixture may be different from a "second fiber" contained in the second fiber mixture. First and second fiber mixtures may also differ in the presence and/or absence of one or more components relative to the other. Combinations of such differences and other configurations of first and second fiber mixtures are also possible. It can be appreciated that the description above with respect to first and second fiber mixtures also applies to additional fiber mixtures (e.g., a "third fiber mixture", a "fourth fiber mixture", etc.).

In some cases, a fiber mixture is processed prior to introduction into the system. For example, for a fiber mixture to be introduced into a system for forming a preformed web, the fiber mixture may be prepared in one or more pulpers. After appropriately mixing the fiber mixture in a pulper, the mixture may be pumped into a flow distributor such as a headbox, where the fiber mixture may optionally be combined with other fiber mixtures or additives. The fiber mixture may also be diluted with additional water such that the final concentration of fiber is in a suitable range, such as for example, between about 0.01% to about 2% by weight (e.g., between about 0.1% to about 1% by weight, or between about 0.1% to about 0.5% by weight).

Optionally, before the fiber mixture is sent to a flow distributor, the fiber mixture may be passed though centrifugal cleaners for removing contaminants or unwanted materials (e.g., unfiberized material used to form the fibers). The fiber mixture may be optionally passed through additional equipment such as a refiner or a deflaker to further enhance the dispersion of the fibers prior to their introduction into the system. Mixers or other components may also be used to enhance dispersion the fibers or other materials in the fiber mixture.

For fiber mixtures that are to be used with a coating unit of a system, a coating blend may be formed with an aqueous or non-aqueous solvent. Optionally, the coating blend may include one or more of the following: a resin (e.g., an acrylic copolymer and/or phenolic resin), a cross-linker, a filler, a viscosity modifier (e.g., thickener), a binder, a suspension aid, a coloring agent, a repellent, a latex, a processing aid, a flocculant, a retention aid, a surfactant and/or another additive. Fibers can be dispersed into the coating blend at any point in the process, thus allowing for control of dispersion rate and/or effect on fiber morphology. The fiber mixture may be dispersed with either high or low sheer mixing equipment depending upon the particular coating blend used, and pumped to a supply tank where it is then dispensed onto the preformed web or fiber mixture using a coating unit. Coating layers involving use of little to no water or solvent are also possible and in such embodiments, the coating blend may be in the form of a heavy slurry, paste, or powder.

Optionally, prior to being introduced into a coating unit, the fiber mixture may be heated, cooled, reacted with other components, milled, or subjected to another process.

The final concentration of the fibers in a fiber mixture used for a coating layer (e.g., prior to any drying process) may be, for example, between about 0.01 wt % and about 99 wt % (e.g., between about 0.01 wt % and about 2 wt %, between about 2 wt % and about 10 wt %, between about 10 wt % and about 50 wt %, between about 30 wt % and about 50 wt %, or between about 50 wt % to about 99 wt %). In some embodiments, the concentration of fibers in the coating layer may be greater than about 0.01 wt %, greater than about 0.1 wt %, greater than about 1 wt %, greater than about 2 wt %, greater than about 5 wt %, greater than about 10 wt %, greater than about 20 wt %, greater than about 30 wt %, greater than about 40 wt %, greater than about 50 wt %, greater than about 60 wt %, greater than about 70 wt %, greater than about 80 wt %, or greater than about 90 wt %. In other embodiments, the concentration of fibers in the coating layer may be less than about 90 wt %, greater than about 80 wt %, less than about 70 wt %, less than about 60 wt %, less than about 50 wt %, less than about 40 wt %, less than about 30 wt %, less than about 20 wt %, less than about 10 wt %, less than about 5 wt %, less than about 2 wt %, less than about 1 wt %, or less than about 0.1 wt %. Combinations of such concentrations, and other concentrations, are also possible.

A fiber mixture (e.g., a fiber mixture introduced into a first fiber web-forming system and/or a coating unit of a system) may contain any suitable fibers for forming all or portions of a fiber web. In some embodiments, a fiber mixture includes one or more glass fibers. The glass fibers may be, for example, microglass fibers or chopped strand glass fibers, which are known to those of ordinary skill in the art. The microglass fibers may have relatively small diameters such as less than about 10.0 microns (e.g., between about 0.1 microns and about 10.0 microns). Fine microglass fibers (e.g., fibers less than 1 micron in diameter) and/or coarse microglass fibers (e.g., fibers greater than or equal to 1 micron in diameter) may be used. The aspect ratios (length to diameter ratio) of the microglass fibers may be generally in the range of about 100 to 10,000. Chopped strand glass fibers may have diameters of, for example, between about 5 microns and about 30 microns, and lengths in the range of between about 0.125 inches and about 1 inch. Other dimensions of glass fibers are also possible.

In some embodiments, a fiber mixture includes one or more synthetic fibers. Synthetic fibers may be, for example, binder fibers, bicomponent fibers (e.g., bicomponent binder fibers) and/or staple fibers. In general, the synthetic fibers may have any suitable composition. Non-limiting examples of synthetic fibers include PVA (polyvinyl alcohol), aramides, polytetrafluoroethylenes, polyesters, polyethylenes, polypropylenes, acrylic resins, polyolefins, polyamides, polystyrene, nylon, rayon, polyurethanes, cellulosic or regenerated cellulosic resins, copolymers of the above materials, and combinations thereof. It should be appreciated that other suitable synthetic fibers may also be used. Synthetic fibers may have fiber diameters ranging from, for example, between about 5 microns and about 50 microns. Other dimensions of synthetic fibers are also possible.

In one set of embodiments, a fiber mixture includes one or more binder fibers (e.g., PVA binder fibers). Binder fibers may have fiber diameters ranging from, for example, between about 5 microns and about 50 microns. Other dimensions of binder fibers are also possible.

In one set of embodiments, a fiber mixture includes one or more bicomponent fibers. The bicomponent fibers may comprise a thermoplastic polymer. Each component of the bicomponent fiber can have a different melting temperature. For example, the fibers can include a core and a sheath where the activation temperature of the sheath is lower than the melting temperature of the core. This allows the sheath to melt prior to the core, such that the sheath binds to other fibers in the layer, while the core maintains its structural integrity. The core/sheath binder fibers can be concentric or non-concentric. Other exemplary bicomponent fibers can include split fiber fibers, side-by-side fibers, and/or "island in the sea" fibers. Bicomponent fibers may have fiber diameters ranging from, for example, between about 5 microns and about 50 microns. Other dimensions of bicomponent fibers are also possible.

In another set of embodiments, a fiber mixture includes one or more cellulose fibers (e.g., wood pulp fibers). Suitable cellulose fiber compositions include softwood fibers, hardwood fibers and combinations thereof. Examples of softwood cellulose fibers include fibers that are derived from the wood of pine, cedar, alpine fir, douglas fir, and spruce trees. Examples of hardwood cellulose fibers include fibers derived from the wood of eucalyptus (e.g., Grandis), maple, birch, and other deciduous trees. Cellulose fibers may have fiber diameters ranging from, for example, between about 5 microns and about 50 microns. Other dimensions of cellulose fibers are also possible.

Figure 3:
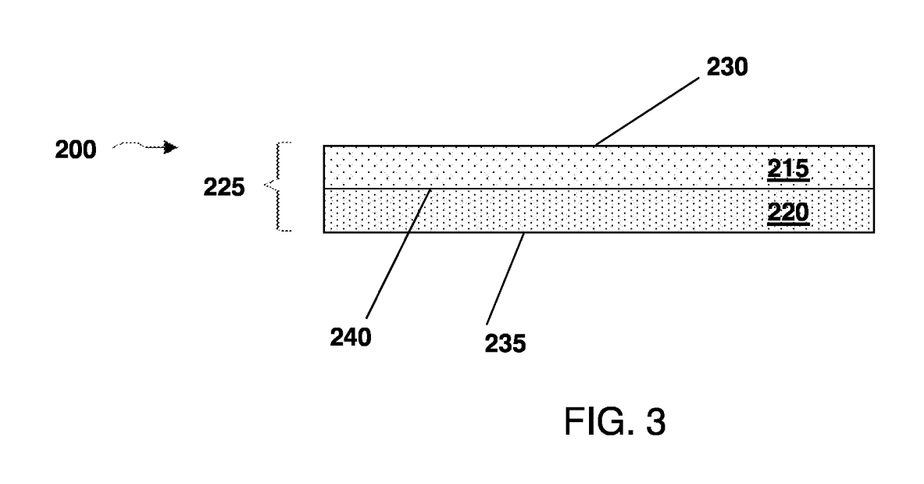
FIG. 3 is a schematic diagram showing a fiber web according to one set of embodiments.
Figure 4:
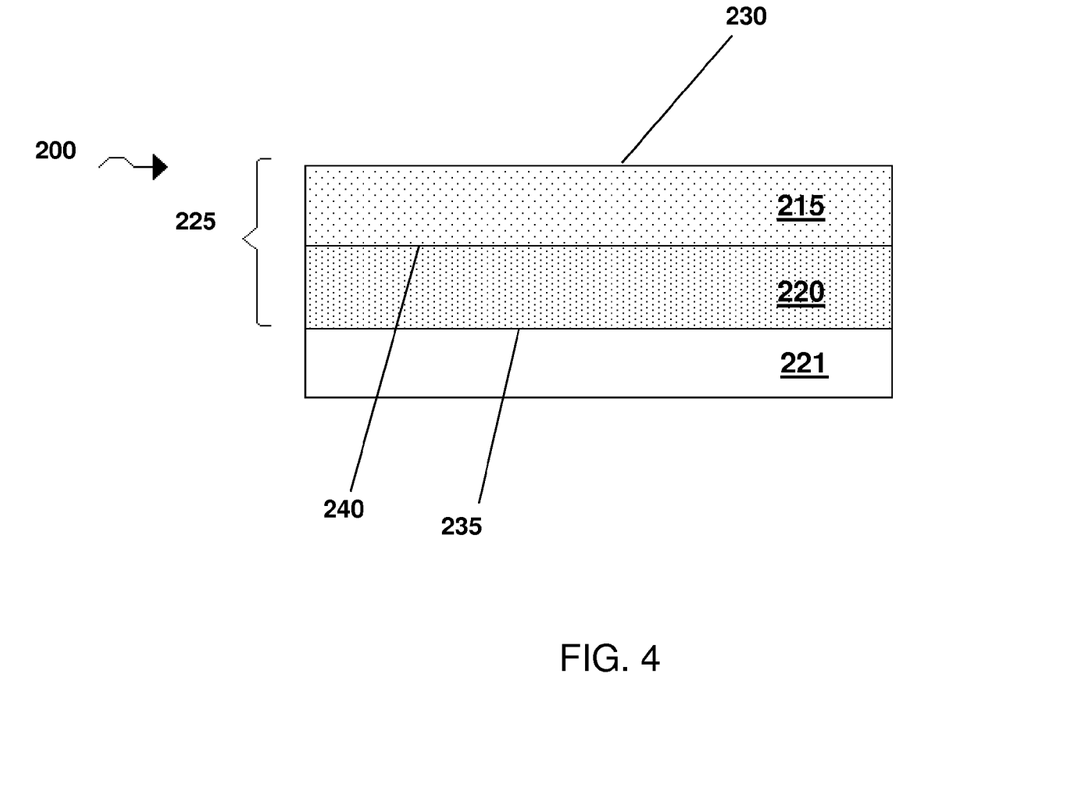
FIG. 4 is a schematic diagram showing a fiber web according to one set of embodiments.

The methods and systems described herein can be used to form fiber webs having a single layer, or multiple layers. In some embodiments involving multiple layers, a clear demarcation of layers may not always be apparent. An example of a fiber web that can be formed using the methods and systems described herein is shown in FIG. 3. As shown illustratively in FIG. 3, a fiber web 200 includes a first layer 215 and a second layer 220. The first layer may be formed using a first fiber web-forming system and the second layer may be formed using a coating unit, as described herein. Optionally, the fiber web may include additional layers (e.g., third layer 221 in FIG. 4). Fiber web 200 may be non-woven.

In some embodiments, fiber web 200 includes a gradient (i.e., a change) in one or more properties such as fiber diameter, fiber type, fiber composition, fiber length, fiber surface chemistry, pore size, material density, basis weight, solidity, a proportion of a component (e.g., a binder, resin, crosslinker), stiffness, tensile strength, wicking ability, hydrophilicity/hydrophobicity, and conductivity across a portion, or all of, a thickness 225 of the fiber web. Fiber webs suitable for use as filter media may optionally include a gradient in one or more performance characteristics such as efficiency, dust holding capacity, pressure drop, air permeability, and porosity across the thickness of the fiber web. A gradient in one or more such properties may be present in the fiber web between a top surface 230 and a bottom surface 235 of the fiber web.

Different types and configurations of gradients are possible within a fiber web. In some embodiments, a gradient in one or more properties is gradual (e.g., linear, curvilinear) between a top surface and a bottom surface of the fiber web. For example, the fiber web may have an increasing basis weight from the top surface to the bottom surface of the fiber web. In another embodiment, a fiber web may include a step gradient in one more properties across the thickness of the fiber web. In one such embodiment, the transition in the property may occur primarily at an interface 240 between the two layers. For example, a fiber web, e.g., having a first layer including a first fiber type and a second layer including a second fiber type, may have an abrupt transition between fiber types across the interface. In other words, each of the layers of the fiber web may be relatively distinct. In other embodiments, a gradient is characterized by a type of function across the thickness of the fiber web. For example a gradient may be characterized by a sine function, a quadratic function, a periodic function, an aperiodic function, a continuous function, or a logarithmic function across the web. Other types of gradients are also possible.

In certain embodiments, a fiber web may include a gradient in one or more properties through portions of the thickness of the fiber web. In the portions of the fiber web where the gradient in the property is not present, the property may be substantially constant through that portion of the web. As described herein, in some instances a gradient in a property involves different proportions of a component (e.g., a fiber, an additive, a binder) across the thickness of a fiber web. In some embodiments, a component may be present at an amount or a concentration that is different than another portion of the fiber web. In other embodiments, a component is present in one portion of the fiber web, but is absent in another portion of the fiber web. Other configurations are also possible.

In some embodiments, a fiber web has a gradient in one or more properties in two or more regions of the fiber web. For example, a fiber web having three layers may have a first gradient in one property across the first and second layer, and a second gradient in another property across the second and third layers. The first and second gradients may be different in some embodiments (e.g., characterized by a different function across the thickness of the fiber web), or may be the same in other embodiments. Other configurations are also possible.

A fiber web may include any suitable number of layers, e.g., at least 2, 3, 4, 5, 6, 7, 8, or 9 layers, or may be formed using any suitable number of fiber mixtures, e.g., at least 2, 3, 4, 5, 6, 7, 8, or 9 fiber mixtures, depending on the particular application and performance characteristics desired. It should be appreciated that in some embodiments, the layers forming a fiber web may be indistinguishable from one another across the thickness of the fiber web. As such, a fiber web formed from, for example, two "layers" or two "fiber mixtures" can also be characterized as having a single "layer" having a gradient in a property across the fiber web in some instances.

Examples of multi-layered fiber webs are disclosed in U.S. Patent Publication No. 2010/0116138, filed Jun. 19, 2009, entitled "Multi-Phase Filter Medium", which is incorporated herein by reference in its entirety for all purposes.

During or after formation of a fiber web, the fiber web may be further processed according to a variety of known techniques. Optionally, additional layers can be formed and/or added to a fiber web using processes such as lamination, co-pleating, or collation. For example, in some cases, two layers are formed into a composite article using a first fiber web-forming system and a coating unit as described above, and the composite article is then combined with a third layer by any suitable process (e.g., lamination, co-pleating, or collation). It can be appreciated that a fiber web or a composite article formed by the processes described herein may be suitably tailored not only based on the components of each fiber layer, but also according to the effect of using multiple fiber layers of varying properties in appropriate combination to form fiber webs having the characteristics described herein.

In some embodiments, further processing may involve pleating the fiber web. For instance, two layers may be joined by a co-pleating process. In some cases, the fiber web, or various layers thereof, may be suitably pleated by forming score lines at appropriately spaced distances apart from one another, allowing the fiber web to be folded. It should be appreciated that any suitable pleating technique may be used.

It should be appreciated that the fiber web may include other parts in addition to the one or more layers described herein. In some embodiments, further processing includes incorporation of one or more structural features and/or stiffening elements. For instance, the fiber web may be combined with additional structural features such as polymeric and/or metallic meshes. In one embodiment, a screen backing may be disposed on the fiber web, providing for further stiffness. In some cases, a screen backing may aid in retaining the pleated configuration. For example, a screen backing may be an expanded metal wire or an extruded plastic mesh.

In some embodiments, fiber webs used as filter media can be incorporated into a variety of filter elements for use in various filtering applications. Exemplary types of filters include hydraulic mobile filters, hydraulic industrial filters, fuel filters (e.g., automotive fuel filters), oil filters (e.g., lube oil filters or heavy duty lube oil filters), chemical processing filters, industrial processing filters, medical filters (e.g., filters for blood), air filters, and water filters. In some cases, filter media described herein can be used as coalescer filter media. The filter media may be suitable for filtering gases or liquids.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of forming a fiber web, comprising:
   forming a first fibrous layer using a fiber web-forming system; and
   forming a second fibrous layer on the first fibrous layer using a coating unit, wherein the step of forming the second fibrous layer comprises depositing a coating layer on the first fibrous layer, and removing a solvent from the coating layer to form the second fibrous layer.

2. The method of claim 1, wherein forming the first fibrous layer comprises:
dispensing a fiber mixture comprising a first fiber and a second fiber into a flow zone of the fiber web-forming system; and
collecting a plurality of first and second fibers downstream of the flow zone in a fiber web forming zone to form the first fibrous layer, wherein the first and second fibers are different.

3. The method of claim 1, comprising forming a third fibrous layer using the fiber web-forming system.

4. The method of claim 1, wherein the coating unit is a gravure.

5. The method of claim 1, wherein the coating unit is a slot die coating unit.

6. The method of claim 1, wherein the coating unit is a sizepress.

7. The method of claim 1, wherein the coating unit is a filmpress.

8. The method of claim 1, further comprising removing a solvent from at least the first fibrous layer using a dewatering system positioned upstream of the coating unit.

9. The method of claim 1, further comprising removing a solvent from the first fibrous layer and/or the coating layer using a dewatering system positioned downstream of the coating unit.

10. The method of claim 9, wherein removing a solvent comprises pulling the solvent from underneath the fiber web.

11. The method of claim 9, wherein removing a solvent comprises pulling the solvent from above the fiber web.

12. The method of claim 1, wherein the first layer comprises fibers having a first diameter, and the second layer comprises fibers having a second diameter, and the first diameter is larger than the second diameter.

13. The method of claim 1, wherein the second fibrous layer comprises fibers having a fiber diameter of less than about 2 microns.

14. The method of claim 13, wherein the fibers having a diameter of less than about 2 microns comprise synthetic fibers.

15. The method of claim 1, wherein the second fibrous layer comprises fibers having a fiber diameter of less than about 1 micron.

16. The method of claim 1, wherein the second fibrous layer comprises fibers having a fiber diameter of less than about 0.5 microns.

17. The method of claim 1, wherein the fiber web-forming system is a wet laid system.

18. The method of claim 1, wherein the fiber web-forming system is a non-wet laid system.

19. The method of claim 1, wherein a mixer or agitator is connected to the coating unit.

20. The method of claim 1, wherein the second fibrous layer comprises fibers having a fiber diameter of less than about 5 microns.

21. The method of claim 20, wherein the fibers having a diameter of less than about 5 microns comprise synthetic fibers.

22. The method of claim 1, wherein the second fibrous layer comprises fibers having a fiber diameter of less than about 3 microns.

23. The method of claim 22, wherein the fibers having a diameter of less than about 3 microns comprise synthetic fibers.

24. The method of claim 1, wherein the coating layer comprises a surfactant and wherein the solvent comprises water.

25. A method of forming a fiber web, comprising:
forming a first fibrous layer using a fiber web-forming system, wherein the fiber web-forming system is a wet laid system; and
forming a second fibrous layer on the first fibrous layer using a coating unit.

26. The method of claim 25, wherein the coating unit is a gravure, a slot die coating unit, a sizepress, or a filmpress.

27. The method of claim 25, further comprising removing a solvent from the first fibrous layer and/or the coating layer using a dewatering system positioned downstream of the coating unit.

28. The method of claim 27, wherein removing a solvent comprises pulling the solvent from underneath the fiber web.

29. The method of claim 27, wherein removing a solvent comprises pulling the solvent from above the fiber web.

30. The method of claim 25, wherein the first layer comprises fibers having a first diameter, and the second layer comprises fibers having a second diameter, and the first diameter is larger than the second diameter.

31. The method of claim 25, wherein the second fibrous layer comprises fibers having a fiber diameter of less than about 5 microns.

32. The method of claim 31, wherein the fibers having a diameter of less than about 5 microns comprise synthetic fibers.

33. The method of claim 25, wherein the second fibrous layer comprises fibers having a fiber diameter of less than about 3 microns.

34. The method of claim 33, wherein the fibers having a diameter of less than about 3 microns comprise synthetic fibers.

35. The method of claim 25, wherein the second fibrous layer comprises fibers having a fiber diameter of less than about 2 microns.

36. The method of claim 35, wherein the fibers having a diameter of less than about 2 microns comprise synthetic fibers.

37. The method of claim 25, wherein the second fibrous layer comprises fibers having a fiber diameter of less than about 1 micron.

38. The method of claim 25, wherein the second fibrous layer comprises fibers having a fiber diameter of less than about 0.5 microns.

39. A method of forming a fiber web, comprising:
forming a first fibrous layer using a fiber web-forming system;
forming a second fibrous layer on the first fibrous layer using a coating unit; and
removing a solvent from the first fibrous layer and/or the second fibrous layer using a dewatering system positioned downstream of the coating unit.

40. The method of claim 39, wherein the coating unit is a gravure, a slot die coating unit, a sizepress, or a filmpress.

41. The method of claim 39, wherein removing a solvent comprises pulling the solvent from underneath the fiber web.

42. The method of claim 39, wherein removing a solvent comprises pulling the solvent from above the fiber web.

43. The method of claim 39, wherein the first layer comprises fibers having a first diameter, and the second layer comprises fibers having a second diameter, and the first diameter is larger than the second diameter.

44. The method of claim 39, wherein the second fibrous layer comprises fibers having a fiber diameter of less than about 5 microns.

45. The method of claim 44, wherein the fibers having a diameter of less than about 5 microns comprise synthetic fibers.

46. The method of claim 39, wherein the second fibrous layer comprises fibers having a fiber diameter of less than about 3 microns.

47. The method of claim 46, wherein the fibers having a diameter of less than about 3 microns comprise synthetic fibers.

48. The method of claim 39, wherein the second fibrous layer comprises fibers having a fiber diameter of less than about 2 microns.

49. The method of claim 48, wherein the fibers having a diameter of less than about 2 microns comprise synthetic fibers.

50. The method of claim 39, wherein the second fibrous layer comprises fibers having a fiber diameter of less than about 1 micron.

51. The method of claim 39, wherein the second fibrous layer comprises fibers having a fiber diameter of less than about 0.5 microns.

* * * * *